United States Patent
Wang

(10) Patent No.: US 6,420,048 B1
(45) Date of Patent: Jul. 16, 2002

(54) HIGH MOLECULAR WEIGHT COPOLYESTERS FROM MACROCYCLIC OLIGOESTERS AND CYCLIC ESTERS

(75) Inventor: Yi-Feng Wang, Waterford, NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

(21) Appl. No.: 09/874,706

(22) Filed: Jun. 5, 2001

(51) Int. Cl.$^7$ .................... B32B 27/06; C08F 20/00
(52) U.S. Cl. .................. 428/480; 528/354; 528/357; 528/359; 525/437
(58) Field of Search ................. 528/354, 357, 528/359; 525/437; 428/480

(56) References Cited

U.S. PATENT DOCUMENTS

| | | | |
|---|---|---|---|
| 3,018,272 A | 1/1962 | Griffing et al. | |
| 3,786,067 A | 1/1974 | Throckmorton et al. | 260/327 |
| 4,605,731 A | 8/1986 | Evans et al. | 528/371 |
| 4,616,077 A | 10/1986 | Silva | 528/371 |
| 4,638,077 A | 1/1987 | Brunelle et al. | 558/281 |
| 4,644,053 A | 2/1987 | Brunelle et al. | 528/371 |
| 4,727,134 A | 2/1988 | Brunelle et al. | 528/371 |
| 4,740,583 A | 4/1988 | Brunelle et al. | 528/370 |
| 4,757,132 A | 7/1988 | Brunelle et al. | 528/357 |
| 4,816,548 A | 3/1989 | Evans et al. | 528/370 |
| 4,829,144 A | 5/1989 | Brunelle et al. | 528/176 |
| 4,831,001 A | 5/1989 | Evans et al. | 502/153 |
| 4,888,411 A | 12/1989 | Shannon et al. | 528/199 |
| 4,904,810 A | 2/1990 | Brunelle et al. | 558/281 |
| 4,980,453 A | 12/1990 | Brunelle et al. | 528/352 |
| 4,992,228 A | 2/1991 | Heck et al. | 264/135 |
| 4,999,420 A | 3/1991 | Leitz et al. | 528/371 |
| 5,006,637 A | 4/1991 | Guggenheim et al. | 528/355 |
| 5,023,346 A | 6/1991 | Schon et al. | 549/231 |
| 5,039,783 A | 8/1991 | Brunelle et al. | 528/272 |
| 5,071,711 A | 12/1991 | Heck et al. | 428/542.8 |
| 5,095,088 A | 3/1992 | Wang | 528/203 |
| 5,097,008 A | 3/1992 | Krabbenhoft et al. | 528/371 |
| 5,116,900 A | 5/1992 | Flautt et al. | 524/377 |
| 5,191,013 A | 3/1993 | Cook et al. | 524/601 |
| 5,191,038 A | 3/1993 | Krabbenhoft et al. | 525/462 |
| 5,207,850 A | 5/1993 | Parekh | 156/166 |
| 5,214,158 A | 5/1993 | Brunelle et al. | 549/267 |
| 5,225,129 A | 7/1993 | van den Berg | 264/85 |
| 5,231,161 A | 7/1993 | Brunelle et al. | 528/272 |
| 5,241,880 A | 9/1993 | Mizobata et al. | 74/502.5 |
| RE34,431 E | 11/1993 | Brunelle et al. | 528/352 |
| 5,264,548 A | 11/1993 | Brunelle et al. | 528/370 |
| 5,281,669 A | 1/1994 | Kambour et al. | 525/177 |
| 5,288,837 A | 2/1994 | Munjal et al. | 528/198 |
| 5,300,392 A | 4/1994 | Odell et al. | 430/130 |
| 5,300,393 A | 4/1994 | Odell et al. | 430/134 |
| 5,300,590 A | 4/1994 | Cook et al. | 525/444 |
| 5,302,484 A | 4/1994 | Odell et al. | 430/127 |
| 5,314,779 A | 5/1994 | Odell et al. | 430/127 |
| 5,321,117 A | 6/1994 | Brunelle | 528/272 |
| 5,340,909 A | 8/1994 | Doerr et al. | 528/276 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Takekoshi et al. | 528/283 |
| 5,389,719 A | 2/1995 | Takekoshi et al. | 524/784 |
| 5,407,984 A | 4/1995 | Brunelle et al. | 524/178 |
| 5,410,014 A | 4/1995 | Haese et al. | 528/196 |
| 5,420,226 A | 5/1995 | Hamer et al. | 528/201 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |

(List continued on next page.)

FOREIGN PATENT DOCUMENTS

| | | |
|---|---|---|
| BE | 676324 | 6/1966 |
| DE | 3607627 | 9/1987 |
| DE | 4034574 | 5/1992 |
| EP | 0000544 | 8/1982 |
| EP | 419254 A2 | 3/1991 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |
| EP | 688778 A1 | 12/1995 |
| EP | 699701 A3 | 9/1996 |
| GB | 957841 | 5/1964 |
| GB | 991020 | 5/1965 |
| JP | 4621873 | 6/1971 |
| JP | 476425 | 2/1972 |
| JP | 6275547 | 4/1987 |
| JP | 02298512 | 12/1990 |
| JP | 09048876 | 2/1997 |
| JP | 2001031846 | 2/2001 |
| SU | 1077893 | 3/1984 |
| WO | 88/06605 | 9/1988 |
| WO | 91/09899 | 7/1991 |
| WO | 93/04106 | 3/1993 |
| WO | 95/30702 | 11/1995 |
| WO | 00/27632 | 5/2000 |

OTHER PUBLICATIONS

Martin et al. (1987) "Pultrusion", *Engineered Materials Handbook: vol. 1 Composites*, pp. 533–543.
Ahjopalo, L. et al. (2000) "Cyclic Oligomers in Saturated Polyesters" *Polymer*, vol. 41, No. 23, 8283–8290.
Brunelle "Macrocycles For The Synthesis of High Molecular Weight Polymers" *Macromolecules*, 197–235, 1995.

(List continued on next page.)

Primary Examiner—Samuel A. Acquah
(74) *Attorney, Agent, or Firm*—Testa, Hurwitz & Thibeault LLP

(57) ABSTRACT

High molecular weight copolyesters have been prepared from macrocyclic oligoesters and cyclic esters in the presence of a transesterification catalyst. The invention generally features a method of making a copolyester, a method of making a block copolymer of copolyester, and a copolyester prepared from macrocyclic oligoesters and cyclic esters.

29 Claims, No Drawings

U.S. PATENT DOCUMENTS

| | | | |
|---|---|---|---|
| 5,527,976 A | 6/1996 | Takekoshi et al. | 585/16 |
| 5,530,052 A | 6/1996 | Takekoshi et al. | 524/447 |
| 5,591,800 A | 1/1997 | Takekoshi et al. | 524/783 |
| 5,605,979 A | 2/1997 | Priddy, Jr. et al. | 525/439 |
| 5,637,655 A | 6/1997 | Priddy, Jr. et al. | 525/438 |
| 5,646,306 A | 7/1997 | Elsasser, Jr. | 549/267 |
| 5,648,454 A | 7/1997 | Brunelle | 528/491 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,693,722 A | 12/1997 | Priddy, Jr. et al. | 525/439 |
| 5,700,888 A | 12/1997 | Hall | 526/190 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,760,161 A | 6/1998 | Goins, Jr. et al. | 528/299 |
| 5,786,440 A | 7/1998 | Kohler et al. | 528/196 |
| 5,795,423 A | 8/1998 | Johnson | 156/166 |
| 5,830,541 A | 11/1998 | Carswell et al. | 427/475 |
| 5,936,029 A | 8/1999 | Hall | 524/572 |
| 5,968,642 A | 10/1999 | Saito | 428/304.4 |
| 6,121,466 A | 9/2000 | Osterholt et al. | 549/267 |
| 6,297,330 B1 | 10/2001 | Burch, Jr. et al. | 525/444 |

OTHER PUBLICATIONS

Brunelle et al. (1998) "Semicrystalline Polymers via Ring–Opening Polymerization: Preparation and Polymerization of Alkylene Phthalate Cyclic Oligomers" *Macromolecules* vol. 31, 4782–4790.

Burch, R. R. et al. (2000) "Synthesis of Cyclic Oligoesters and Their Rapid Polymerization to High Molecular Weight" Macromolecules, vol. 33, No. 14, 5053–5064.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157–161.

Hamilton et al. (1998) "Cyclic Polyesters: Part 8. Preparation and Characterization of Cyclic Oligomers in Six Aromatic Ester and Ether–Ester Systems" *Polymer* vol. 39, No. 14., 3241–3252.

Harrison, A. G. et al. (1997) "Analysis of cyclic oligomers of poly(ethylene terephthalate) by liquid chromatography/ mass spectrometry" Polymer Communications, vol. 38, No. 10, 2549–2555.

Henshaw et al. (1994) "Recycling of a Cyclic Thermoplastic Composite Material by Injection and Compression Molding" *J. of Thermoplastic Composite Materials* vol. 7(1), 14–29.

Hubbard, P. A. (1996) "Polyesters via Macrocyclic Oligomers" Dissertation presented at the University of Akron.

Kricheldorf, H. R. et al. (1997) "Macrocycles IV. Macrocyclic Polylactones as Bifunctional Monomers for Polycondensations" *Journal of Polymer Science*, vol. 36, No. 9, 1373–1378.

Kricheldorf, H. R. et al. (1998) "Macrocycles. 3. Telechelic Polylactones via Macrocyclic Polymerization" Macromolecules, vol. 31, No. 3, 614–620.

Lattimer et al. (1998) "MALDI–MS Analysis of Pyrolysis Products From a Segmented Polyurethane" *Journal of Analytical and Applied Pyrolysis*, vol. 48, 1–15.

Liu et al. (1999) "Preparation of Cyclic Polyester Oligomers and Ultra–low VOC Polyester Coatings" *Polymer Preprints*, vol. 40, No. 1.

Martin et al. "Pultrusion" 533–543.

Miller, S. (1998) "Macrocyclic polymers from cyclic oligomers of poly(butylene terephthalate)" Dissertation Presented at University of Massachusetts, Amherst, MA US.

Mueller, F.J. et al. (1983) "Synthesis of Cyclic Oligomers of Butylene Terephthalate" *Makromol. Chem.*, vol. 184, No. 12, 2487–95.

Perovic, A. (1985) "Morphological Instability of poly(ethylene terephthalate) cyclic oligomer crystals" *Journal of Material Science*, vol. 20, Iss. 4, 1370–1374.

Perovic et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society , Perkin Transactions 2*, vol. 8, 1617–1625.

Brunelle (1995) "Macrocycles For The Synthesis of High Molecular Weight Polymers" pp. 197–235, ch. 6, New Methods of Polymer Synthesis: vol. 2, edited by J. R. Ebdon and G. C. Eastmond.

HIGH MOLECULAR WEIGHT COPOLYESTERS FROM MACROCYCLIC OLIGOESTERS AND CYCLIC ESTERS

TECHNICAL FIELD

This invention generally relates to thermoplastics and articles formed therefrom. More particularly, the invention relates to high molecular weight copolyesters and their preparation from macrocyclic oligoesters and cyclic esters.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss and solvent resistance. Linear polyesters are conventionally prepared by the reaction of a diol with a dicarboxylic acid or its functional derivative, typically a diacid halide or ester. Linear polyesters may be fabricated into articles of manufacture by a number of known techniques including extrusion, compression molding, and injection molding.

Recently, macrocyclic oligoesters were developed which have unique properties. These properties make them attractive as matrices for engineering thermoplastic composites. The desirable properties stem from the fact that macrocyclic oligoesters exhibit low melt viscosity, allowing them easily to impregnate a dense fibrous preform followed by polymerization to polyesters. Furthermore, certain macrocyclic oligoesters melt and polymerize at temperatures well below the melting point of the resulting polymer. Upon melting and in the presence of an appropriate catalyst, polymerization and crystallization can occur virtually isothermally.

Despite the above-described properties and other advantages, some of the resulting polyesters prepared from macrocyclic oligoesters typically display an increase in crystallinity that invariably diminishes the favorable properties including the polymer's ductility. Thus, methods are needed for preparing polyesters with favorable cystallinity and ductility while retaining the advantages of using macrocyclic oligoesters as precursors to polyesters.

SUMMARY OF THE INVENTION

Copolyesters of high molecular weight have been prepared from macrocyclic oligoesters and cyclic esters in the presence of a transesterification catalyst. The copolyesters so prepared show favorable crystallinity and ductility while retaining other desirable properties of polyesters prepared from macrocyclic oligoesters as precursors.

In one aspect, the invention generally features a method of making a copolyester. In one embodiment, the method includes the steps of providing a macrocyclic oligoester, providing a cyclic ester other than a macrocyclic oligoester, and contacting the macrocyclic oligoester and the cyclic ester in the presence of a transesterification catalyst at an elevated temperature to produce a copolyester. The macrocyclic oligoester has a structural repeat unit of formula (I):

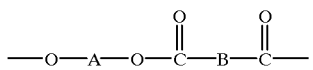
(I)

wherein A is an alkylene, a cycloalkylene, or a mono- or polyoxyalkylene group; and B is a divalent aromatic or alicyclic group.

In another aspect, the invention generally features a method of making a block copolymer of polyesters. In one embodiment, the method includes contacting a macrocyclic oligoester and a transesterification catalyst at an elevated temperature to form a first polymeric segment. Subsequently contacting the first polymeric segment, a cyclic ester that is not a macrocyclic oligoester, and the transesterification catalyst at an elevated temperature forms a second polymeric segment. The above steps then are sequentially repeated a desired number of times to form a block copolyester having additional first and second polymeric segments.

In another embodiment that is a variation of the above method of making a block copolymer, a first polymeric segment is formed by contacting a cyclic ester that is not a macrocyclic oligoester and a transesterification catalyst at an elevated temperature. Subsequently contacting this first polymeric segment, a macrocyclic oligoester, and the transesterification catalyst at an elevated temperature forms a second polymeric segment. The above steps then are sequentially repeated a desired number of times to form a block copolymer having additional first and second polymeric segments.

In yet another aspect, the invention features a composition that is a copolyester. In one embodiment, the copolyester contains, within its polymeric backbone, at least one structural unit of formula (I) (as defined above) and at least one structural unit of formula (II)

(II)

wherein $R_1$ and $R_2$ are independently an organic moiety with the proviso that $R_1$ is not —O—A'— if $R_2$ is —B'—C(O)—. A' is an alkylene, a cycloalkylene, or a mono- or polyoxyalkylene group. B' is a divalent aromatic or alicyclic group.

In yet another aspect, the invention features a block copolymer of polyesters. A first block unit of the copolymer has, within its polymeric backbone, at least one first structural unit of formula (I), as defined above. A second block unit has, within its polymeric backbone, at least one second structural unit of formula (II), as defined above.

The foregoing and other objects, aspects, features, and advantages of the invention will become more apparent from the following description and claims.

DESCRIPTION

The present invention is related to the surprising discovery that high molecular weight copolyesters having favorable crystallinity and ductility can be prepared from macrocyclic oligoesters and cyclic esters in the presence of a transesterification catalyst.

Definitions

The following general definitions may be helpful in understanding the various terms and expressions used in this specification.

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, an "oligoester" means a molecule that contains 2 or more identifiable ester functional repeat units of the same or different formula.

As used herein, a "macrocyclic oligoester" means a macrocyclic oligomer containing 2 or more identifiable ester functional repeat units of the same or different formula. A macrocyclic oligoester typically refers to multiple molecules of one specific formula having varying ring sizes. However, a macrocyclic oligoester may also include multiple molecules of different formulae having varying numbers of the same or different structural repeat units. A macrocyclic oligoester may be a co-oligoester or multi-oligoester, i.e., an oligoester having two or more different structural repeat units having an ester functionality within one cyclic molecule.

As used herein, a "cyclic ester" means a cyclic molecule having at least one ring within its molecular structure that contains an ester functionality within the ring. A cyclic ester typically refers to multiple molecules of one specific cyclic ester. A cyclic ester as used herein is not a macrocyclic oligoester as defined above.

As used herein, "an alkylene group" means $-C_nH_{2n}-$, where $n \geq 2$.

As used herein, "a cycloalkylene group" means a cyclic alkylene group, $-C_nH_{2n-x}-$, where x represents the number of H's replaced by cyclization(s).

As used herein, "a mono- or polyoxyalkylene group" means $[-(CH_2)_m-O-]_n-(CH_2)_m-$, wherein m is an integer greater than 1 and n is an integer greater than 0.

As used herein, "a divalent aromatic group" means an aromatic group with links to other parts of the macrocyclic molecule. For example, a divalent aromatic group may include a meta- or para-linked monocyclic aromatic group (e.g., benzene).

As used herein, "an alicyclic group" means a non-aromatic hydrocarbon group containing a cyclic structure therein.

As used herein, a "block copolymer" means a copolymer having segments of two or more polymers linked to one another. A block copolymer has constitutionally different structural units. Adjacent segments (i.e., blocks) contain structural units derived from different characteristic species of monomer or from structural repeat units with different composition or sequence distribution.

As used herein, "a polyester polymer composite" means a polyester polymer that is associated with another substrate such as a fibrous or particulate material. Illustrative examples of particulate material are chopped fibers, glass microspheres, and crushed stone. Certain fillers and additives thus can be used to prepare polyester polymer composites. A fibrous material means more continuous substrate, e.g., fiberglass, ceramic fibers, carbon fibers or organic polymers such as aramid fibers.

As used herein, "a divalent organic moiety" means any organic group so long as it does not interfere with the polymerization reaction of a macrocyclic oligoester and a cyclic ester. The organic moiety can be saturated or unsaturated. The organic moiety can be a hydrocarbon group or in addition can contain one or more heteroatoms. The organic moiety can be linear or branched, or contain one or more cyclic or heterocyclic structures containing one or more O, N, or S atoms. Exemplary $R_1$ and $R_2$ groups include divalent mono- or polyalkylene groups containing 1–20 carbon atoms, cyclicalkylene groups containing 1–20 carbon atoms, and substituted or unsubstituted divalent aromatic groups such as phenyl groups or alicyclic groups containing 1–20 carbon atoms.

Copolyesters from Macrocyclic Oligoesters and Cyclic Esters

High molecular weight copolyesters have been prepared from macrocyclic oligoesters and cyclic esters in the presence of a transesterification catalyst.

In one aspect, the invention generally features a method for making a copolyester. The method includes the steps of providing a macrocyclic oligoester, providing a cyclic ester other than a macrocyclic oligoester, and contacting the macrocyclic oligoester and the cyclic ester in the presence of a transesterification catalyst at an elevated temperature to produce a copolyester. The macrocyclic oligoester has a structural repeat unit of formula (I):

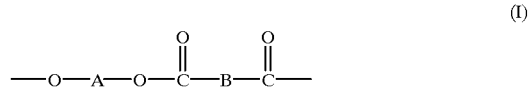

(I)

wherein A is an alkylene, a cycloalkylene, or a mono- or polyoxyalkylene group; and B is a divalent aromatic or alicyclic group.

Polymerization reaction occurs between a macrocyclic polyester oligomer and a cyclic ester. The polymerization typically is completed within minutes. The duration of the polymerization reaction depends on many factors such as the molar ratio of macrocyclic oligoester to cyclic ester, the molar ratio of monomers (the macrocyclic oligoesters and the cyclic esters) to catalyst, the temperature at which the polymerization reaction is carried out, the desired molecular weight, and the choice of solvent. The polymerization is preferably conducted under an inert environment, such as under nitrogen or argon, or under a vacuum.

The molar ratio of cyclic ester to macrocyclic oligoester can vary from about 0.01 to 10. In one embodiment, the molar ratio of cyclic ester to macrocyclic oligoester is between about 0.1 to about 1. In another embodiment, the molar ratio of cyclic ester to macrocyclic oligoester is between about 0.1 to about 0.5. The molar ratio of ester monomers (macrocyclic oligoester and cyclic ester combined) to the catalyst can range from about 500 to about 500,000. In one embodiment, the molar ratio of ester monomers to catalyst is from about 1,000 to about 500,000. In another embodiment, the molar ratio is about 1,000 to about 100,000. In yet another embodiment, the molar ratio is from about 1,000 to about 10,000.

Yields of copolyesters depend on, among other factors, the precursor monomers used, the reaction conditions, and the work-up procedure. Typical yields range from about 90% to about 98%. The resulting copolyesters typically have molecular weights from about 90 k to about 150 k. The temperature range of melting endotherm can be as low as about 145° C. to about 180° C. for high cyclic ester content to as high as about 200° C. to about 230° C. for low cyclic ester content. The peak temperature ranges from about 165° C. to about 220° C. The heat of melting is determined by differential scanning calorimetry (DSC) to be from about 10 to about 50 Joule/g.

Copolyesters prepared according to methods of the invention show improved crystallinity and ductility as demonstrated by the temperature range of melting endotherm and the heat of melting of the resulting copolyesters. Copolyesters having a 40% caprolactone content, for example, exhibit a drastically lowered melting point range and reduced heat of melting, indicative of low crystallinity and high ductility. (See Examples which follow.)

The polymerization reaction may be carried out with or without a solvent. A solvent may be used to dissolve one or more of the reactants and/or to mix the reactants. A solvent may also be used as a medium in which the reaction is carried out. Illustrative solvents that may be used include high-boiling compounds such as o-dichlrorobenzene and meta-terphenyl. In another embodiment, no solvent is used in the polymerization reaction.

One of the precursors employed in an embodiment of the invention to prepare copolyesters is a macrocyclic oligoester. Many different macrocyclic oligoesters readily can be made and are useful in the practice of this invention. Thus, depending on the desired properties of the final copolyester polymer product, the appropriate macrocyclic oligoester(s) can be selected for use in its manufacture.

Macrocyclic oligoesters that may be employed in this invention include, but are not limited to, macrocyclic poly(alkylene dicarboxylate) oligomers having a structural repeat unit of the formula:

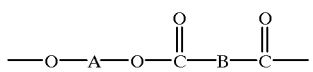
(I)

wherein A is an alkylene, a cycloalkylene, or a mono- or polyoxyalkylene group; and B is a divalent aromatic or alicyclic group.

Preferred macrocyclic oligoesters are macrocyclic oligoesters of 1,4-butylene terephthalate (CBT), 1,3-propylene terephthalate (CPT), 1,4-cyclohexylenedimethylene terephthalate (CCT), ethylene terephthalate (CET), and 1,2-ethylene 2,6-naphthalenedicarboxylate (CEN), and macrocyclic co-oligoesters comprising two or more of the above structural repeat units.

Synthesis of the macrocyclic oligoesters may be achieved by contacting at least one diol of the formula HO—A—OH with at least one diacid chloride of the formula:

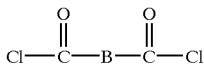

where A and B are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water immiscible organic solvent such as methylene chloride. The temperature of the reaction typically is within the range of from about −25° C. to about 25° C. See, e.g., U.S. Pat. No. 5,039,783 to Brunelle et al.

Macrocyclic oligoesters also can be prepared via the condensation of a diacid chloride with at least one bis(hydroxyalkyl) ester such as bis(4-hydroxybutyl) terephthalate in the presence of a highly unhindered amine or a mixture thereof with at least one other tertiary amine such as triethylamine. The condensation reaction is conducted in a substantially inert organic solvent such as methylene chloride, chlorobenzene, or a mixture thereof. See, e.g., U.S. Pat. No. 5,231,161 to Brunelle et al.

Another method for preparing macrocyclic oligoesters or macrocyclic co-oligoesters is the depolymerization of linear polyester polymers in the presence of an organotin or titanate compound. In this method, linear polyesters are converted to macrocyclic oligoesters by heating a mixture of linear polyesters, an organic solvent, and a transesterification catalyst such as a tin or titanium compound. The solvents used, such as o-xylene and o-dichlorobenzene, usually are substantially free of oxygen and water. See, e.g., U.S. Pat. No. 5,407,984 to Brunelle et al. and U.S. Pat. No. 5,668,186 to Brunelle et al.

It is also within the scope of the invention to employ macrocyclic co-oligoesters to produce copolyesters. Therefore, unless otherwise stated, an embodiment of a composition, article, or process that refers to macrocyclic oligoesters also includes embodiments utilizing macrocyclic co-oligoesters.

Cyclic esters employed in various embodiments of the invention include any cyclic esters that react with a macrocyclic oligoester to form a copolyester under transesterification conditions.

Cyclic esters include lactones. The lactones may be a cyclic ester of any membered ring. In one embodiment, lactones of 5–10 membered rings are used. The lactone can be unsubstituted or substituted. One or more carbon atoms in the lactone structure can be substituted with a heteroatom such as O, N, or S. One or more hydrogen atoms in the basic lactone structure can be substituted with a halogen atom (e.g., F, Cl, Br, or I) or other functional groups including alkyl groups (e.g., methyl, ethyl, propyl, butyl, etc.), a hydroxy group, alkyloxy groups, a cyano group, amino groups, and aromatic groups. The lactone can contain one or more additional rings. Illustrative examples of lactones include lactide, glycolide, dioxanone, 1,4-dioxane-2,3-dione, ε-caprolactone, β-propiolactone, tetramethyl glycolide, β-butyrolactone, γ-butyrolactone, and pivalolactone.

Catalysts employed in the invention are those that are capable of catalyzing a transesterification polymerization of a macrocyclic oligoester with a cyclic ester. As with state-of-the-art processes for polymerizing macrocyclic oligoesters, organotin and organotitanate compounds are the preferred catalysts, although other catalysts may be used. For example, organotin compound dibutyltin dioxide can be used as polymerization catalyst. Other illustrative organotin compounds include 1,1,6,6-tetra-n-butyl-1,6-distanna-2,5,7,10-tetraoxacyclodecane, n-butyltin(IV) chloride dihydroxide, dialkyltin(IV) oxides, such as di-n-butyltin(IV) oxide and di-n-octyltin oxide, and acyclic and cyclic monoalkyltin(IV) derivatives such as n-butyltin tri-n-butoxide, dialkyltin(IV) dialkoxides such as di-n-butyltin (IV) di-n-butoxide and 2,2-di-n-butyl-2-stanna-1,3-dioxacycloheptane, and trialkyltin alkoxides such as tributyltin ethoxide. See, e.g., U.S. Pat. No. 5,348,985 to Pearce et al. In addition, tin catalysts described in commonly owned U.S. Ser. No. 09/754,943 (incorporated herein by reference in its entirety) may be used in the polymerization reaction.

As for titanate compounds, tetra-isopropyl titanate may be employed in the invention. Other examples of titanate catalysts that can be used include tetra(2-ethylhexyl) titanate, tetraisopropyl titanate, tetrabutyl titanate, and titanate compounds described in commonly owned U.S. Ser. No. 09/754,943 (incorporated herein by reference in its entirety).

The polymerization reaction is carried out at an elevated temperature. In one embodiment, the temperature is maintained within a range from about 100° C. to about 300° C. In one embodiment, the temperature is maintained within a range from about 100° C. to about 260° C. In another embodiment, the temperature is maintained within a range from about 150° C. to about 210° C. In another embodiment, the temperature is maintained within a range from about 170° C. to about 200° C. In yet another embodiment, the temperature is maintained within a range from about 180° C. to about 190° C.

In another embodiment, the invention generally features a method of making a block copolymer of polyesters. Specifically, contacting a macrocyclic oligoester and a transesterification catalyst at an elevated temperature forms a first polymeric segment. Subsequently contacting the first polymeric segment, a cyclic ester that is not a macrocyclic oligoester, and the transesterification catalyst at an elevated temperature forms a second polymeric segment. The above steps are then sequentially repeated a desired number of times to form a block copolyester having additional first and second polymeric segments.

The above method of making a block copolymer may be modified in its sequence to begin with a cyclic ester. The polymerization may begin with a formation of a block of cyclic ester. Thus, a first polymeric segment is formed by contacting a cyclic ester that is not a macrocyclic oligoester and a transesterification catalyst at an elevated temperature. Subsequently contacting the first polymeric segment, a macrocyclic oligoester, and the transesterification catalyst at an elevated temperature forms a second polymeric segment. The above steps are then sequentially repeated a desired number of times to form a block copolymer having additional first and second polymeric segments.

In one embodiment, to prepare a block copolyester having blocks derived from a macrocyclic oligoester and a cyclic ester, the macrocyclic oligoester and the cyclic ester are reacted sequentially instead of simultaneously. Depending on the applications, it may be desirable to have a block copolymer having blocks derived from both macrocyclic oligoester and cyclic ester. Thus, the method of making a block copolymer can include a step of contacting a cyclic ester and a macrocyclic oligoester in the presence of a polymerization catalyst to form a third type of block. A protocol can be designed to achieve the desired copolyester having two or more different blocks. In addition, the same of different polymerization catalysts may be used in forming the two or more different blocks in preparing a block copolyester. More than one catalyst may be employed in each of the polymerization steps.

In yet another aspect, the invention features a composition of a copolyester. The copolyester has, within its polymeric backbone, at least one structural unit of formula (I) and at least one structural unit of formula (II)

$$-R_1-O-C(O)-R_2- \quad (II)$$

wherein $R_1$ and $R_2$ are independently a divalent organic moiety with the proviso that $R_1$ is not $-O-A'-$ if $R_2$ is $-B'-C(O)-$. $A'$ is an alkylene, a cycloalkylene, or a mono- or polyoxyalkylene group. $B'$ is a divalent aromatic or alicyclic group.

In another embodiment, the invention features a block copolymer of polyesters. The block copolymer contains at least a first block unit and a second block unit. The first block unit has, within its polymeric backbone, at least one first structural unit of formula (I). The second block unit has, within its polymeric backbone, at least one second structural unit of formula (II).

In one embodiment, the block copolymer contains additional blocks containing at least one structural unit of formula (I) and containing at least one structural unit of formula (II). Thus, a block copolymer may contain blocks derived from macrocyclic oligoesters, blocks derived from cyclic esters, and blocks derived from both macrocyclic oligoesters and cyclic esters. The length of the individual blocks and the sequence thereof can be designed to serve particular applications.

The compositions and methods of the invention may be used to manufacture articles of various size and shape from various macrocyclic oligoesters and cyclic esters. Exemplary articles that may be manufactured by the invention include without limitation automotive body panels and chassis components, bumper beams, aircraft wing skins, windmill blades, fluid storage tanks, tractor fenders, tennis rackets, golf shafts, windsurfing masts, toys, rods, tubes, bars stock, bicycle forks, and machine housings.

In the manufacture of an article, various types of fillers may be included. A filler often is included to achieve a desired purpose or property, and may be present in the resulting polyester polymer. For example, the purpose of the filler may be to provide stability, such as chemical, thermal or light stability, to the blend material or the polyester polymer product, and/or to increase the strength of the polyester polymer product. A filler also may provide or reduce color, provide weight or bulk to achieve a particular density, provide flame resistance (i.e., be a flame retardant), be a substitute for a more expensive material, facilitate processing, and/or provide other desirable properties as recognized by a skilled artisan. Illustrative examples of fillers are, among others, fumed silicate, titanium dioxide, calcium carbonate, chopped fibers, fly ash, glass microspheres, micro-balloons, crushed stone, nanoclay, linear polymers, and monomers. A filler may be added before, during, or after the polymerization reaction between a macrocyclic oligoester and a cyclic ester. Fillers can be used to prepare polyester polymer composites.

Furthermore, in the manufacture of an article additional components (e.g., additives) may be added. Illustrative additives include colorants, pigments, magnetic materials, anti-oxidants, UV stabilizers, plasticizers, fire-retardants, lubricants, and mold releases.

EXAMPLES

The following examples are provided to further illustrate and to facilitate the understanding of the invention. These specific examples are intended to be illustrative of the invention. The products obtained from these examples may be confirmed by conventional techniques such as proton and carbon-13 nuclear magnetic resonance spectroscopy, mass spectroscopy, infrared spectroscopy, differential scanning calorimetry and gel permeation chromatography analyses.

Example A

The macrocyclic oligoesters used in the following examples are the macrocyclic oligoesters of 1,4-butylene terephthalate. The macrocyclic oligoesters were prepared by heating a mixture of polyester linears, organic solvents, such as o-xylene and o-dichlorobenzene, which are substantially free of oxygen and water, and tin or titanium compounds as transesterification catalysts. See U.S. Pat. No. 5,668,186 (incorporated herein by reference in its entirety).

Example 1

A small vial (21×70 mm, 4 drum), equipped with a 2.5 cm magnetic stirring bar and an argon/vacuum adapter, was charged with 2.0 g of macrocyclic oligesters of 1,4-butylene terephthalate. The vial was then connected to vacuum and immersed into an oil bath at 190° C. Upon melting, the molten liquid was dried for 3 minutes under 1 mm vacuum. The vacuum was then released with argon. Under argon, predetermined amount (51.9 mg to 415 mg) of ε-caprolactone (dried over molecular sieves) was added via a syringe. The mixture was stirred for one minute at 190° C. under argon. A predetermined amount (0.30 mole %) of tin catalyst Fomrez® SUL-11A was then added as a solution in o-dichlorobenzene. Fomrez® SUL-11A is a 1:1 reaction product of dibutyltin dioxide/DIOP plasticizer available from Witco Chemicals (Crompton Corporation). The resulting reaction mixture became viscous. Stirring stopped within about 5 to 10 seconds. After 15 minutes, the vial was removed from the oil bath and was immediately cooled with ice-water. The vial was broken to retrieve a sample of the polymer. After dissolution in 15% hexfluoroisopropanol/chloroform, the sample was analyzed by gel permeation chromatography (GPC). The test results are shown in Table 1.

TABLE 1

Co-Polymerization Of Macrocyclic Oligoesters CBT
With ε-Caprolactone Using A Tin Catalyst

| ε-Caprolactone/ CBT (Molar Ratio) | % Polymer | Mw[a] | Tm (° C.)[b] | Temp. Range Of Melting Endotherm (° C.) | ΔH[c] (J/g) |
|---|---|---|---|---|---|
| 00/100 | 94 | 132,300 | 221 | 198–230 | 49.7 |
| 05/100 | 96 | 140,180 | 214 | 200–230 | 43.9 |
| 15/100 | 96 | 139,680 | 196 | 175–220 | 23.1 |
| 20/100 | 98 | 121,850 | 190 | 175–220 | 24.7 |
| 25/100 | 97 | 134,490 | 185 | 160–220 | 19.8 |
| 30/100 | 97 | 130,400 | 177 | 160–190 | 17.8 |
| 35/100 | 98 | 128,800 | 170 | 150–180 | 14.4 |
| 40/100 | 92 | 136,000 | 164 | 145–180 | 11.8 |

[a]Molecular weight (by GPC relative to polystyrene standards)
[b]Peak temperature of the melting endotherm (by DSC with heating rate of 20° C./min)
[c]Heat of melting (DSC with a heating rate of 20° C./min Example 2

A small vial (21×70 mm, 4 drum), equipped with a 2.5 cm magnetic stirring bar and argon/vacuum adapter, was charged with 2.0 g of macrocyclic oligesters of 1,4-butylene terephthalate. The vial was then connected to vacuum and immersed into an oil bath at 190° C. Upon melting, the molten liquid was dried for 3 minutes under 1 mm vacuum. The vacuum was then released with argon. Under argon, predetermined amount (51.9 mg to 415 mg) of ε-caprolactone (dried over molecular sieves) was added via a syringe. The mixture was stirred for one minute at 190° C. under argon. A predetermined amount (0.30 mole %) of titanate catalyst Tyzor® TPT was then added as a solution in o-dichlorobenzene. Tyzor® TPT is tetra-isopropyl titanate available from E.I. du Pont Nemours and Company (Wilmington, Del.). The resulting reaction mixture became viscous. Stirring stopped within about 5 to 10 seconds. After 15 minutes, the vial was removed from oil bath, and was immediately cooled with ice-water. The vial was then broken to retrieve a sample of the polymer. After dissolution in 15% hexfluoroisopropanol/chloroform, the sample was analyzed by GPC. The test results are shown in Table 2.

TABLE 2

Co-Polymerization Of Macrocyclic Oligoesters CBT
With ε-Caprolactone Using A Titanate Catalyst

| ε-Caprolactone/ CBT (Molar Ratio) | % Polymer | Mw[a] | Tm (° C.)[b] | Temp. Range Of Melting Endotherm (° C.) | ΔH[c] (J/g) |
|---|---|---|---|---|---|
| 25/100 | 98% | 95,000 | 190 | 170–200 | 13.0 |

[a]Molecular weight (by GPC relative to polystyrene standards)
[b]Peak temperature of the melting endotherm (by DSC with heating rate of 20° C./min)
[c]Heat of melting (by DSC with heating rate of 20° C./min)

Each of the patent documents disclosed hereinabove is incorporated by reference herein in their entirety. Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of making a copolyester, the method comprising the steps of:

(a) providing a macrocyclic oligoester having a structural repeat unit of formula (I):

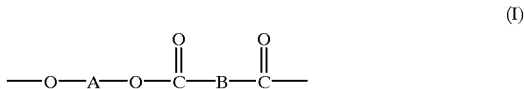

(I)

wherein
   A is an alkylene, a cycloalkylene, or a mono- or polyoxyalkylene group; and
   B is a divalent aromatic or alicyclic group;

(b) providing a cyclic ester, wherein the cyclic ester is not a macrocyclic oligoester; and (c) contacting the macrocyclic oligoester and the cyclic ester in the presence of a transesterification catalyst at an elevated temperature to produce the copolyester.

2. The method of claim 1 wherein the cyclic ester is a lactone.

3. The method of claim 2 wherein the lactone is ε-caprolactone.

4. The method of claim 1 wherein the macrocyclic oligoester comprises macrocyclic oligo(1,4-butylene terephthalate).

5. The method of claim 1 wherein the macrocyclic oligoester comprises macrocyclic oligo(ethylene terephthalate).

6. The method of claim 1 wherein the transesterification catalyst comprises a tin compound.

7. The method of claim 6 wherein the tin compound is a dialkyltin oxide.

8. The method of claim 1 wherein the transesterification catalyst comprises a titanate compound.

9. The method of claim 8 wherein the titanate compound is an alkyl titanate.

10. The method of claim 1 wherein the elevated temperature is within a temperature range from about 100° C. to about 300° C.

11. The method of claim 1 wherein the elevated temperature is within a temperature range from about 100° C. to about 260° C.

12. The method of claim 1 wherein the elevated temperature is within a temperature range from about 150° C. to about 210° C.

13. A method of making a block copolymer of polyesters, the method comprising the steps of:

(a) contacting a macrocyclic oligoester and a transesterification catalyst at an elevated temperature to form a first polymeric segment, wherein the macrocyclic oligoester has a structural repeat unit of formula (I):

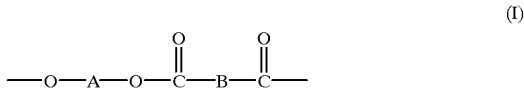

(I)

wherein
- A is an alkylene, a cycloalkylene, or a mono- or polyoxyalkylene group; and
- B is a divalent aromatic or alicyclic group;

(b) contacting a cyclic ester, the first polymeric segment, and the transesterification catalyst at an elevated temperature to form a second polymeric segment, wherein the cyclic ester is not a macrocyclic oligoester; and (c) sequentially repeating steps (a) and (b) a desired number of times to form a block copolymer having additional first and second polymeric segments.

14. The method of claim 13 wherein the cyclic ester is a lactone.

15. The method of claim 13 wherein the macrocyclic oligoester is macrocyclic oligo(1,4-butylene terephthalate).

16. The method of claim 13 wherein the transesterification catalyst comprises a tin compound.

17. The method of claim 13 wherein the transesterification catalyst comprises a titanate compound.

18. The method of claim 13 wherein the elevated temperature is within a temperature range from about 100° C. to about 300° C.

19. A method of making a block copolymer of polyesters, the method comprising the steps of:

(a) contacting a cyclic ester and a transesterification catalyst at an elevated temperature to form a first polymeric segment, wherein the cyclic ester is not a macrocyclic oligoester; and (b) contacting a macrocyclic oligoester, the first polymeric segment, and the transesterification catalyst at an elevated temperature to form a second polymeric segment, wherein the macrocyclic oligoester has a structural unit of formula (II)

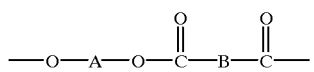
(I)

wherein
- A is an alkylene, a cycloalkylene, or a mono- or polyoxyalkylene group, and
- B is a divalent aromatic or alicyclic group; and (c) sequentially repeating steps (a) and (b) a desired number of times to form a block copolymer having additional first and second polymeric segments.

20. A copolyester comprising, within its polymeric backbone, (a) at least one structural unit of formula (I)

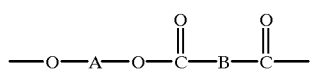
(I)

wherein
- A is an alkylene, a cycloalkylene, or a mono- or polyoxyalkylene group, and
- B is a divalent aromatic or alicyclic group; and (b) at least one structural unit of formula (II)

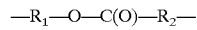
(II)

wherein
- $R_1$ and $R_2$ are independently a divalent organic moiety with the proviso that $R_1$ is not —O—A'— if $R_2$ is —B'—C(O)— wherein
- A' is an alkylene, a cycloalkylene, or a mono- or polyoxyalkylene group; and
- B' is a divalent aromatic or alicyclic group.

21. The copolyester of claim 20 wherein A is 1,4-butylene and B is benzene.

22. The copolyester of claim 20 wherein A is ethylene and B is benzene.

23. A block copolymer comprising (a) a first block unit comprising, within its polymeric backbone, at least one structural unit of formula (I)

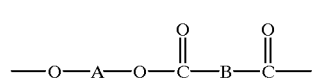
(I)

wherein
- A is an alkylene, a cycloalkylene, or a mono- or polyoxyalkylene group, and
- B is a divalent aromatic or alicyclic group; and (b) a second block unit comprising, within its polymeric backbone, at least one structural unit of formula (II)

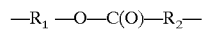
(II)

wherein
- $R_1$ and $R_2$ are independently a divalent organic moiety with the proviso that $R_1$ is not —O—A'— if $R_2$ is —B'—C(O)— wherein
- A' is an alkylene, a cycloalkylene, or a mono- or polyoxyalkylene group; and
- B' is a divalent aromatic or alicyclic group.

24. A copolyester prepared by the method of claim 1.

25. A block copolymer of polyesters prepared by the method of claim 14.

26. A block copolymer of polyesters prepared by the method of claim 19.

27. An article of manufacture comprising the copolyester of claim 20.

28. A composite material comprising the block copolymer of claim 23.

29. An article of manufacture comprising the block copolymer of claim 23.

* * * * *

UNITED STATES PATENT AND TRADEMARK OFFICE
CERTIFICATE OF CORRECTION

PATENT NO. : 6,420,048 B1 Page 1 of 1
DATED : July 16, 2002
INVENTOR(S) : Yi-Feng Wang It is certified that error appears in the above-identified patent and that said Letters Patent is hereby corrected as shown below:

<u>Column 11,</u>
Line 35, please delete "formula (II)" and replace with -- formula (I) --.

Signed and Sealed this

Twenty-eighth Day of June, 2005

JON W. DUDAS
*Director of the United States Patent and Trademark Office*